United States Patent
Gupta et al.

(10) Patent No.: US 7,484,079 B2
(45) Date of Patent: Jan. 27, 2009

(54) PIPELINE STAGE INITIALIZATION VIA TASK FRAME ACCESSED BY A MEMORY POINTER PROPAGATED AMONG THE PIPELINE STAGES

(75) Inventors: Shail Aditya Gupta, Sunnyvale, CA (US); Mukund Sivaraman, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 526 days.

(21) Appl. No.: 10/284,965

(22) Filed: Oct. 31, 2002

(65) Prior Publication Data
US 2004/0088520 A1    May 6, 2004

(51) Int. Cl.
*G06F 9/00* (2006.01)
(52) U.S. Cl. ...................................... 712/220
(58) Field of Classification Search .................. 712/19, 712/220, 232, 241
See application file for complete search history.

(56) References Cited

U.S. PATENT DOCUMENTS

| | | | |
|---|---|---|---|
| 4,916,659 A * | 4/1990 | Persoon et al. ............... 712/18 |
| 4,991,088 A | 2/1991 | Kam |
| 5,274,812 A | 12/1993 | Inoue |
| 5,455,938 A | 10/1995 | Ahmed |
| 5,551,039 A | 8/1996 | Weinberg et al. |
| 5,634,059 A | 5/1997 | Zaiki |
| 5,717,895 A | 2/1998 | Leedom et al. |
| 5,742,814 A | 4/1998 | Balasa et al. |
| 5,764,951 A | 6/1998 | Ly et al. |
| 5,802,375 A | 9/1998 | Ngo et al. |
| 5,845,126 A | 12/1998 | Ju et al. |
| 5,875,466 A | 2/1999 | Wakerly |
| 5,953,531 A | 9/1999 | Megiddo et al. |
| 5,954,803 A | 9/1999 | Nakai et al. |
| 5,987,254 A | 11/1999 | Subrahmanyam |
| 6,016,397 A | 1/2000 | Ogasawara et al. |
| 6,044,417 A * | 3/2000 | Muljono et al. ............... 710/52 |
| 6,055,627 A | 4/2000 | Kyushima et al. |
| 6,078,745 A | 6/2000 | De Greef et al. |
| 6,108,724 A | 8/2000 | Din |
| 6,154,829 A | 11/2000 | Mino et al. |
| 6,298,071 B1 | 10/2001 | Taylor et al. |
| 6,324,629 B1 | 10/2001 | Kulkarni et al. |
| 6,374,403 B1 | 4/2002 | Darte et al. |
| 6,388,632 B1 | 5/2002 | Tanaka et al. |
| 6,438,747 B1 | 8/2002 | Schreiber et al. |
| 6,462,743 B1 * | 10/2002 | Battle ........................ 345/506 |

(Continued)

FOREIGN PATENT DOCUMENTS

WO    WO01/59593    8/2001

OTHER PUBLICATIONS

Hennessy and Patterson, "Computer Architecture—A Quantitative Approach, 2nd Edition," 1996, pp. 127, 129, 134, 136, 190.*

(Continued)

*Primary Examiner*—David J Huisman

(57) ABSTRACT

An embodiment of the present invention includes a pipeline comprising a plurality of stages and a pipeline timing controller controlling a plurality of predetermined delays, wherein, when one of the predetermined delays has expired, the pipeline timing controller sends a control signal to initiate at least one process within associated ones of the plurality of stages.

30 Claims, 4 Drawing Sheets

U.S. PATENT DOCUMENTS

| | | | |
|---|---|---|---|
| 6,539,454 B2* | 3/2003 | Mes | 711/105 |
| 6,594,814 B1 | 7/2003 | Jou et al. | |
| 6,609,088 B1 | 8/2003 | Wuytack et al. | |
| 6,681,388 B1 | 1/2004 | Sato et al. | |
| 6,732,297 B2 | 5/2004 | Oura | |
| 6,820,250 B2* | 11/2004 | Muthukumar et al. | 717/116 |
| 6,839,889 B2 | 1/2005 | Liu | |
| 6,853,968 B2 | 2/2005 | Burton | |
| 6,934,250 B1 | 8/2005 | Kejriwal et al. | |
| 2002/0032559 A1 | 3/2002 | Hellestrand et al. | |
| 2004/0034754 A1 | 2/2004 | Schreiber | |
| 2004/0088520 A1 | 5/2004 | Gupta et al. | |

OTHER PUBLICATIONS

Hennessy and Patterson, "Computer Architecture—A Quantitative Approach, 2$^{nd}$ Edition," 1996, pp. 279-281.*

R. Schreiber, et al. "PICO-NPA: High-Level Synthesis of Nonprogrammable Hardware Accelerators," Journal of VLSI Signal Processing, to appear. Hewlett-Packard Laboratories, Palo Alto, California 94304-1126, pp. 1-22.

J. Steensma, et al., "Symbolic Macro Test for DSP Systems Applied to a Voice Coder Application," pp. 215-223.

Christine Eisenbeis, et al., "A Strategy for Array Management in Local Memory." (Jul. 1990) pp. 1-40.

A. Agarwal, et al., "Automatic Partitioning of Parallel Loops and Data Arrays for Distributed Shared Memory Multiprocessors," pp. 1-41.

J. Rosseel, et al., "An Optimisation Methodology for Array Mapping of Affine Recurrence Equations in Video and Image Processing," IEEE, pp. 415-426 (1994).

S. Malik, "Analysis of Cyclic Combinational Circuits," Short Papers IEEE Transactions on Computer-aided Design of Integrated Circuits and Systems, vol. 13, No. 7, (Jul. 1994) pp. 950-956.

A. Srinivasan, et al. "Practical Analysis of Cyclic Combinational Circuits," IEEE 1996 Custom Integrated Circuits Conference, pp. 381-384.

Guest Editorial, IEEE Transactions on Computer-aided Design of Integrated Circuits and Systems, vol. 18, No. 1, (Jan. 1999) pp. 1-2.

K. Danckaert, et al. "Strategy for Power-Efficient Design of Parallel Systems," IEEE Transactions on Very Large Scale Integration (VLSI) Systems, vol. 7, No. 2, (Jun. 1999) pp. 258-265.

F. Vermeulen, et al., "Extended Design Reuse Trade-Offs in Hardware-Software Architecture Mapping," (2000) pp. 103-107.

R. Schreiber, et al., "High-Level Synthesis of Nonprogrammable Hardware Accelerators," IEEE (2000) pp. 1-12.

S. Mahlke, et al., "Bitwidth Cognizant Architecture Synthesis of Custom Hardware Accelerators," IEEE Transactions on Computer-Aided Design of Integrated Circuits and Systems, vol. 20, No. 11, (Nov. 2001) pp. 1355-1371.

P. R. Panda, et al., "Data and Memory Optimization Techniques for Embedded Systems," ACM Transactions on Design Automation of Electronic Systems, vol. 6, No. 2, (Apr. 2001) pp. 149-206.

S. Meftali, et al., "An Optimal Memory Allocation for Application-Specific Multiprocessor System-on-Chip," (2001) pp. 19-24.

T. Van Achteren, et al., "Data Reuse Exploration Techniques for Loop-dominated Applications," Proceedings of the 2002 Design, Automation and Test in Europe Conference and Exhibition, IEEE Computer Society, (Jan. 2002).

"Omega Project Source Release, version 1.2," (Aug. 2002), [on-line] [Retrieved on Jul. 16, 2002] Retrieved from: http://www.cs.umd.edu/projects/omega/release-1.2.html, pp. 1-2.

Seeds for Tomorrow's World—IMECnology, [on-line] [Retrieved on Jun. 12, 2002] Retrieved from: http://www.imec.be/.

S. Meftali, et al., "An Optimal Memory Allocation for Application-Specific Multiprocessor System-on-Chip," Proceedings of the International Symposium on Systems Synthesis—vol. 14, [on-line] [Retrieved on Jun. 12, 2002] Retrieved from: .../citation.cfm?id= 500006&coll= portal&dl= ACM&CFID= 2929668&CFTOKEN= 57821200.

G. Havas, et al. "Extended GCD and Hermite Normal Form Algorithms Via Lattice Basis Reduction," Experimental Mathmatics, v. 7 (1998).

G Panneerselvam—"Why Dynamic Pipelines for Systolic Systems?"—Proceedings of the International Conference on Computer Technology, Systems and Applications—May 1987—pp. 689-694.

Miguel Valero-Garcia et al—"A Method for Implementation of One-Dimensional Systolic Algorithms With Data Contraflow Using Pipelined Functional Units"—Journal of VLSI Signal Processing Systems for Signal, Image and Video Technology vol. 4 No. 1—Feb. 1992—pp. 7-25.

Panda, P R et al- "Efficient Utilization of Scratch-Pad Memory in Embedded Processor Applications"-Mar. 17, 1997-pp. 7-11.

Kandemire, M et al.- "Compiler-Directed Selection of Dynamice Memory Layouts"-Apr. 25, 2001, -pp. 219-244.

Grun, P et al.-"APEX: Access Pattern Based Memory Architecture Exploration"-Sep. 30, 2001-pp. 25-32.

Catthor, F et al.-"Hot Topic Session: How to Solve the Current Memory Access and Data Transfer Bottlenecks . . . "-Mar. 27, 2000-pp. 426-433.

Kandemir, M et al.-"Exploiting Scratch-Pad Memory using Presburger Formulas"-Sep. 30, 2001-pp. 7-12.

McFarland, MC et al.-"The High-level Synthesis of Digital Systems"-Proc of the IEEE vol. No. 1- Feb. 1, 1990-pp. 301-318.

Park, N et al.-"Sehwa: A Software Package for Synthesis of Pipelines From Behavioral Specifications"-IEEE Transactions vol. 7 No. 3-Mar. 1998-pp. 356-370.

De Greef E et al. "Memory Sixe Reduction through Storage Order Optimization for Embedded Parrallel Multimedia Applications."-Intnl. Parallel Proc. Symp. (IPPS) in Proc. Workshop on "Parallel Processing and Multimedia," Geneva, Switzerland, Apr. 1997 pp. 84-98.

Quillere, F et al. "Optimizing Memory Usage in the Polyhedral Model," ACM Transactions on Programming Languages and Systems, 2000, 22(5)773-815, ACM Press, New York.

Lefebvre, V et al. "Automatic Storage Management for Parallel Programs"-Laboratoire PRiSM, Universite de Versailles, 1997, pp. 1-20.

Darte, A. et al.-"Lattice-Based Memory Allocation"-Proceedings of the 2003 International Conference on Compilers, Architechtures, and Synthesis for Embedded Systems, pp. 298-308, Oct. 2003, ACM Press, New York.

* cited by examiner

PIPELINE STAGE INITIALIZATION VIA TASK FRAME ACCESSED BY A MEMORY POINTER PROPAGATED AMONG THE PIPELINE STAGES

RELATED APPLICATIONS

This application is related to concurrently filed, patent application Ser. No. 10/284,932, now U.S. Pat. No. 7,107,199, entitled Method and System for the Design of Pipelines of Processors, the disclosure of which is hereby incorporated by reference herein.

FIELD OF THE INVENTION

The present invention relates to operations performed by a computer system and, in particular, to the control of pipeline stages.

BACKGROUND

A large class of modern embedded system computations can be expressed as a sequence of transformations on a stream of data. The sequence of transformations may be performed by an acyclic network of process stages hereby known as a "general pipeline" (or simply "pipeline") with at least one start stage that accepts input data from external sources, at least one end stage which outputs data to external destinations, and some number of intermediate stages that accept data from at least one preceding stage, performs a specific computation or transformation and forwards its results to at least one subsequent stage. A simple example of a "general pipeline" is the common notion of a linear pipeline consisting of a linear sequence of processing stages, where the first stage of the pipeline accepts input data, and each subsequent stage of the pipeline may accept data from the previous stage, may perform a specific computation or transformation on the data, and may pass the result along to the next stage of the pipeline or, in the case of the last stage of a pipeline, output the data. This entire sequence of computations on a given set of input data is called a "task", and the computation within each stage of the pipeline for that input data is called a "subtask". In addition to the data that is passed between stages of the pipeline, control information may also be necessary to ensure the various stages of the pipeline perform their function at the appropriate time. Pipeline stages may be separated by buffers, e.g., registers, that may be used to store data between the various stages of the pipeline.

Each stage in the pipeline may, in general, compute for several cycles before passing the result to a subsequent stage. A clock signal may be used to control the flow of data through the various stages of the pipeline. Communication between adjacent stages of the pipeline may also be used to control the flow of data through the respective pipeline stages. This communication between stages is typically called handshaking. In this form of pipeline control, as output data from a preceding stage is available to the input of the subsequent stage, a control message may be sent between the stages to coordinate the activity between the stages. In other words, as data from a previous "producer" stage becomes available, it is written into a register or buffer, and an independent control signal may be sent to the subsequent "consumer" stage to indicate that the data is available for use. Once the consumer stage finishes reading the data from the register or input buffer, the consumer stage may also signal the producer stage that it has read the data from the register or buffer. Once the producer stage has received the communications from all the consumer stages, the producer stage may write new data to the register or the buffer for use in subsequent cycles without inadvertently overwriting data yet to be read.

One method of reducing the time required to process information in a pipeline is to overlap data processing between producer and consumer stages. One method of overlapping data processing may rely on doubling the number of registers or the size of the buffers available to store data between the various stages. By doubling the number of registers or the size of the buffers between the various stages, the producer stage may write into a first buffer or register prior to reading while the consumer stage simultaneously reads data from the previous task from the second buffer. In this manner, the producer stage is not delayed if the consumer stage is not ready so that the overall time for information to pass through the pipeline is reduced.

In addition to the input data, stages of a pipeline may require access to other information to perform the computation. For example, pipeline stages may require initialization or configuration to a predetermined state, or access to data stored in an external memory location before or during the computations or transformations in the stage.

SUMMARY OF THE INVENTION

An embodiment of the present invention includes a generalized pipeline comprising a plurality of stages; and a pipeline timing controller controlling a plurality of predetermined delays, wherein, when one of said predetermined delays has expired, the pipeline timing controller sends a control signal to initiate at least one process within associated ones of the plurality of stages.

DETAILED DESCRIPTION

Figure 1:
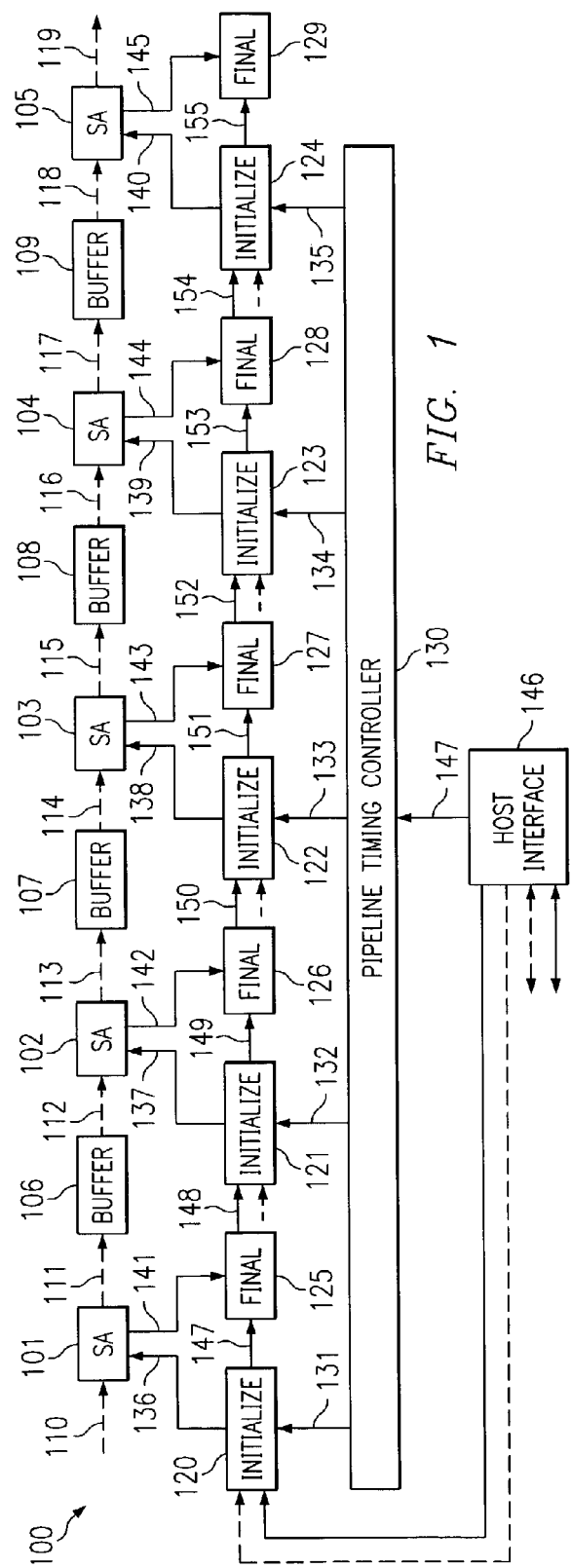
FIG. 1 is a block diagram of one embodiment of a generalized pipeline containing five stages consisting of systolic arrays.

FIG. 1 illustrates one embodiment of a generalized pipeline containing five stages including Systolic Arrays (SAs) 101-105. Buffer 106 is connected between SAs 101 and 102. Likewise, buffer 107 is connected between SAs 102 and 103, buffer 108 between SAs 103 and 104 and buffer 109 between SAs 104 and 105. Note that while buffers are shown between stages, in other configurations, one or more buffers may be eliminated. Alternatively, more than one buffer may be used between stages. Alternatively, more than one stage may write to the same buffer or read from the same buffer. An SA is a group of processors that performs a particular stage subtask that needs to be performed in a specific order. Note that while FIG. 1 illustrates five stages of a pipeline connected in sequence in which each stage includes an SA, the particular configuration is selected only for purposes of illustrating an embodiment consistent with the present invention and is but one example of the number and type of stages forming a generalized pipeline. The present invention is applicable for any number of stages that include any type of stage connected in any manner consistent with a generalized pipeline.

FIG. 1 also includes separate data and control paths. The data path begins with input data 110 applied to SA 101, input data 111 connected to buffer 106; input data 112 connected to SA 102; input data 113 connected to buffer 107; input data 114 connected to SA 103; input data 115 connected to buffer 108, input data 116 connected to SA 104, input data 117 connected to buffer 109, input data 118 connected to A 105 and the output of SA 105 being output data 119. Data is also sent from host interface 146 to each of the Initialization (INIT) blocks 120-124. The data paths are indicated by dashed lines.

Embodiments of the invention include steps that lead to the design of hardware pipelines in which each loop nest of a task procedure is implemented by a pipeline stage in which an array of processing elements is deployed, and each such processing element is itself pipelined, and has the capacity to process iterations of the loop nest periodically, at a rate determined by an initiation interval (II). Such a pipelined processor starts execution and finishes execution of one iteration of the loop nest every II machine cycles. Each loop may be synthesized into an array of processors according to its iteration schedule and throughput requirement, and then multiple arrays of processors are "strung" together in a pipeline communicating via inter-stage buffers.

In addition to the data flow through the various pipeline stages, control information may also be present to ensure that the various stages of the pipeline perform their assigned subtasks at the appropriate time. INIT blocks 120-124 are used to initialize data used within SAs 101-105, respectively. This initialization data must be available before the various stages of the pipeline perform their computations with data input to the stage or otherwise execute their specific subtasks. INIT blocks 120-124 may also be used to write data into a register in the associated SA. FINAL blocks 125-129 are finalization blocks and accept results from stages SA 101-105 respectively, thereby releasing the respective stage outputs to be available for the next task in the pipeline. Note that FINAL blocks 125-129 as well as INIT blocks 120-124 are stage specific and may or may not be present depending on the function of the pipeline. FINAL blocks 125-129 may be used to read data from a register located in the associated SA. If these blocks are present, initialization control information and synchronization for these blocks may be required.

As shown in FIG. 1, pipeline timing controller 130 may supply timing signals via connections 131-135 to INIT blocks 120-124 respectively. These timing signals may be used to initialize the INIT blocks, while the INIT blocks 120-124 are used to initialize the SAs 101-105 respectively. Note that initializing of the INIT block involves the sending of a start signal from the timing controller while initialization of the SA includes initializing internal registers or memory of the SA with control data needed to execute a subtask and starting the subtask in SA at the appropriate time.

Once timing controller 130 supplies a timing signal via connection 131 to INIT block 120, INIT block 120 initializes the subtask performed by SA 101 via connection 136. Once the subtask, computation, or transformation is accomplished in SA 101, SA 101 initializes FINAL block 125 via connection 141. Similarly, INIT block 121 initializes the process performed in SA 102 via connection 137 and SA 102 initializes FINAL block 126 via connection 142. The process performed in SA 103 is initialized via INIT block 122 via connection 138 and SA 103 initializes FINAL block 127 via connection 143. INIT block 123 initializes SA 104 via connection 139 with SA 104 storing data in FINAL block 128 via connection 144 and INIT block 124 initializes SA 105 via connection 140 with SA 105 via connection 140 with SA 105 storing data in FINAL block 129 via connection 145.

Figure 5:
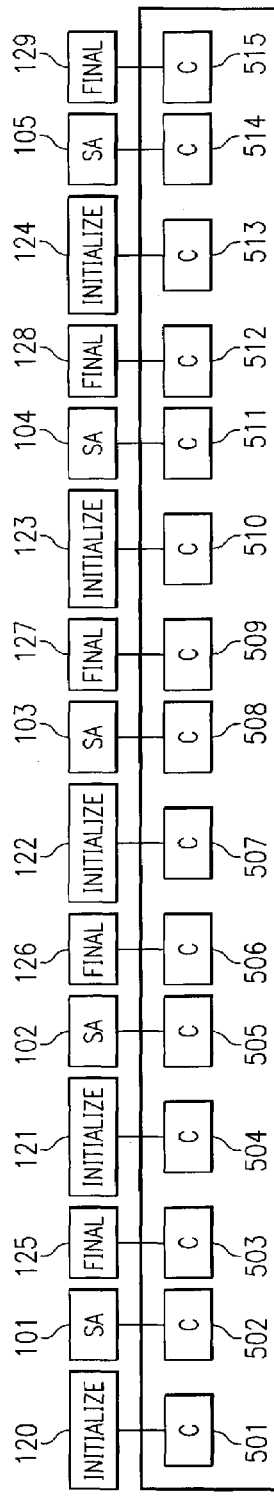
FIG. 5 is a block diagram of an alternate embodiment of pipeline timing controller.

Note that FIG. 1 shows one embodiment of the present invention and that other embodiments are possible. In one configuration as shown in FIG. 5, the timing controller 130 may provide a separate timing signal to INIT blocks 120-124, SAs 101-105, and FINAL blocks 125-129. In this configuration, pipeline timing controller 130 would directly control the initialization of the INIT block, the pipeline stage, and the FINAL block, for each of the five stages of the pipeline. Also note that in the embodiment shown in FIG. 1, the INIT block, SA, and FINAL block computations are sequentialized. However, in the embodiment shown in FIG. 5, these computations may be overlapped, the INIT block may be operating on the next task while SA is operating on a current task and the FINAL block is operating on the previous task. In yet another embodiment, multiple counters may be assigned to the same stage controlling different subtasks in that stage.

Buffers 106-109 are latches or holding areas for information between the various stages of the pipeline. Typically buffers have tight size requirements and tight access patterns. This includes a very tight control of the movement of data into and reading data from the buffers. A producer stage may generate just enough data for the consumer stage to begin processing and continue producing data for consumption by the consumer stage. In this manner, a smaller buffer is required while reducing the overall time required for completion of the entire task. This reduction in time is a result of the consumer stage, using limited data, operating in parallel with the producer stage. Conversely, FINAL blocks 125-129 may contain bookkeeping data after the completion of each stage in the pipeline process. Bookkeeping data may be used to extract information from the pipeline for later use.

Host Interface (Host IF) block 146 is the interface between the pipeline and other circuits in the computer system. Host IF block 146 may access information from computer memory or from a register file for use by the pipeline process. Host IF block 146 may also accept a start signal for a new task from other processes within the computer system and pass this signal to timing controller 130 via connection 147. Timing controller 130 uses the start signal received from host IF block 146 to provide the appropriate signals to INIT blocks 120-124 via connections 131-135 respectively. Computer processes outside pipeline 100 may access information from the various stages of pipeline 100 through host interface or pipeline output 119.

In one embodiment, host IF block 146 may pass a pointer or other indication of a memory location to first INIT block 120 indicating the position of the control data (also known as the Task Frame). A task frame contains all the information that is required to control the execution of one particular task through the various stages of a pipeline. Different stages of pipeline 100 may need different portions of the task frame. The various INIT blocks 120-124 may perform memory transactions using the pointers supplied by host IF block 146 to access control data from the task frame for use by the respective SA. The timing of these transactions is carefully controlled by the timing controller that starts the respective INIT blocks. Host IF block 146 decodes commands from the host processor including the run command that begins the processing of a new task in the pipeline. A chain link including links 147-155 links each of the INIT and FINAL blocks and is used to propagate the task frame base address through the pipeline stages in parallel with the performed task. This chain link allows many tasks to be in the pipeline at the same time and stay synchronized with the corresponding base addresses.

Pipeline timing controller 130 translates an incoming pulse 147 into a number of pulses. In a preferred embodiment, the number of pulses is equal to the number of stages plus 1. The pulses are delayed by a number of clock cycles that may vary from stage to stage. In one embodiment, a pulse is produced for each of the pipeline stages and is delayed so as to begin the corresponding initialization unit at an appropriate time. The initialization unit will then ensure the required values are loaded into the pipeline stage and will then issue a run command to the pipeline stage. A final pulse is produced at the end of the computation for the current task and may be used as a notification signal sent to the host processor.

Figure 2:
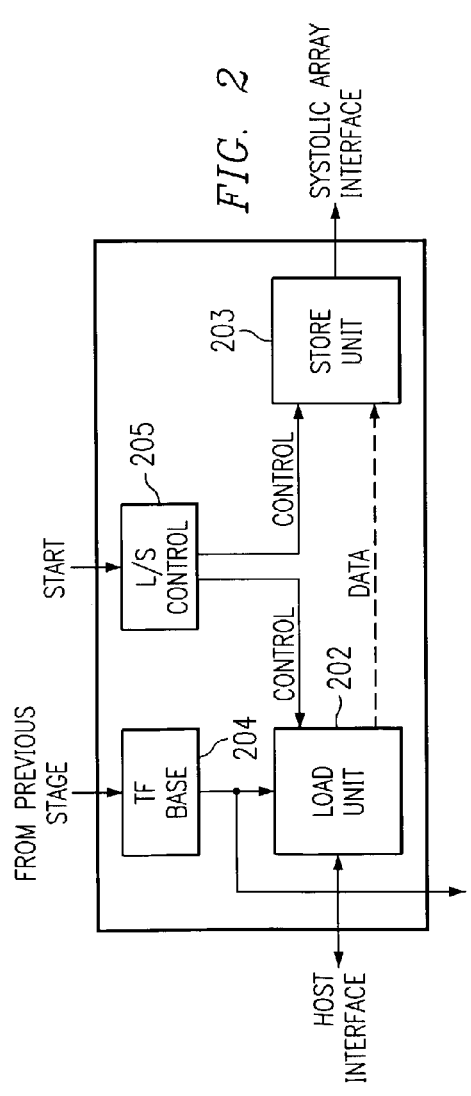
FIG. 2 is a block diagram of one embodiment of an initialization block.

FIG. 2 illustrates one embodiment of an initialization (INIT) block. The overall job of this embodiment of an INIT block is to access and receive task frame control data from an external memory interface 201 and pass the information to the SA interface. INIT block 120 needs data from the task frame and stores that data back in the appropriate SA. Note that the INIT block may also be used to process the initialization data before that data is communicated to the appropriate SA. The INIT block may also be a processor to perform even more complex processing.

In one embodiment, the host interface block 146 provides a task frame base address to initialize the task frame base register 204 (TF Base) of the first INIT block at the start of a new task. The load unit 202 fetches control data from the external memory at fixed offsets from the task frame base address via the host interface. Data from load unit 202 is forwarded to store unit 203 and store unit 203 stores the fetched data into the associated SA and controls the associated SA. Load unit 202 and store unit 203 are controlled by a Load/Store (L/S) timing control logic 205 which controls this transfer of data. TF base 204 is used to point to the correct task frame associated with the current task. In a preferred embodiment the task frame base memory address is also pipelined from stage to stage to simultaneously support multiple tasks being executed in different stages of the pipeline. L/S control 205 provides signals to time loading from the host interface into the SA interface. The start input into L/S control comes from the timing controller.

Figure 3:
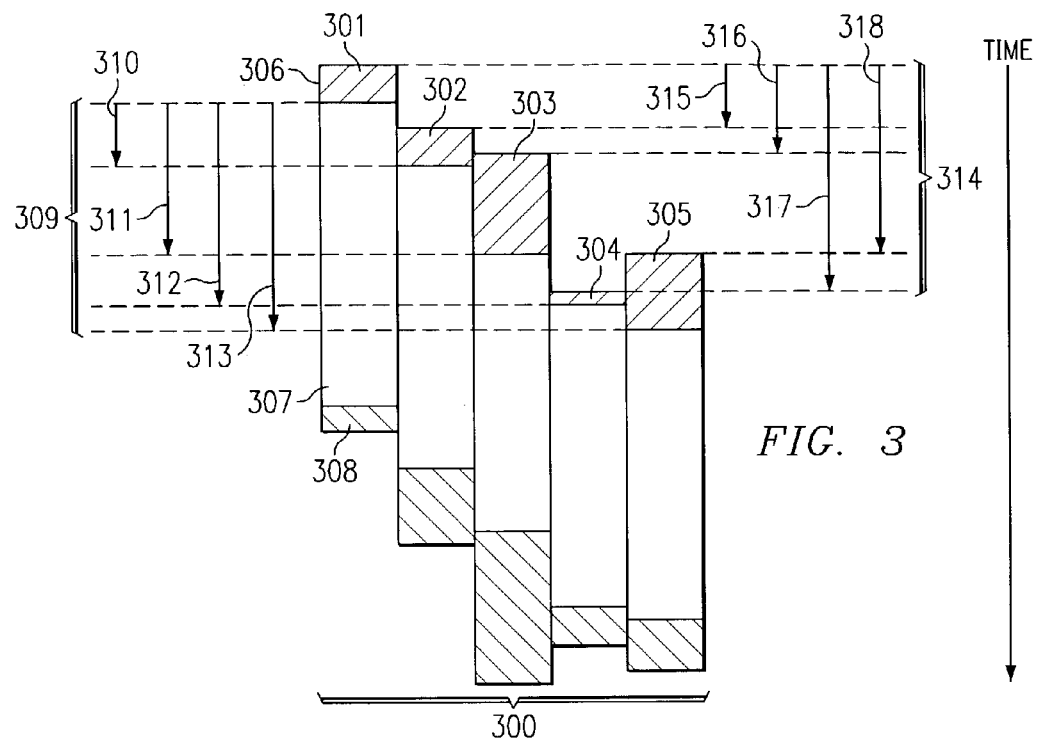
FIG. 3 is a timing diagram of the operation of a pipeline that contains five stages according to one embodiment of the invention.

FIG. 3 illustrates a particular example of the timing of the full process for a pipeline having five stages. Timing bar grouping 300 indicates the relative timing requirements for the subtasks executing in the various stages of the pipeline. Vertical bars 301, 302, 303, 304, and 305 illustrate the timing requirements required for each subtask of the various stages of pipeline 100 of FIG. 1. Note that these various pipeline stages have non-trivial, typically partially overlapping extents, each ranging over a number of, and often many, clock cycles. Each stage may have different timing considerations.

Typically, each bar represents three phases of stage operation: stage initialization, processing, and time during which final stage cleanup is performed. Thus, vertical timing bar 301 is composed of three portions: INIT block time 306, SA time 307 and FINAL block time 308. The length of the vertical portions of the various sections of the bar indicates the amount of time required for each of the various processes involved. Portion 309 of FIG. 3 represents the displacement for the various stages of the pipeline. The displacement is the time delay between when the actual subtask computation begins at the first stage and when the actual subtask computation begins in the other succeeding stages. For example, displacement 310 shows the amount of time that passes between the start of the real subtask computation of SA 101 to the beginning of the real subtask computation of SA 102 on the same task. Similarly, displacement 311 shows the delay associated with the start of the third stage 103, displacement 312 shows the delay associated with the start of the fourth stage 104 and displacement 313 shows the delay associated with the start of the fifth stage 105 respectively from the start of first stage 101. More than one stage may also start computation at the same displacement. These predetermined, fixed timing displacements show the relative timing between the various computations being performed in the various stages of the pipeline on the same task. These delays assure that each stage of the pipeline process will initiate processing at the appropriate time, e.g., as soon as when the appropriate input data and resources are available. Note that while these delays have been measured as time differences between stage processing start times, these delays may be instead represented as delays from the start of the INIT block, the end of the INIT block, the start of the stage, the end of the stage, the start of the FINAL block, the end of the FINAL block or some combination of these time periods.

In one embodiment, the timing displacements ensure that, for instance, the first stage has completed its computations and has written the result into the intervening buffer prior to the start of the second stage which requires that data be present in the buffer before it begins its process. By delaying the start of the second stage to allow for the time required for the first stage to complete its processing and store the data, stage two is assured of having its required input. This timing methodology ensures that each stage of the pipeline will be completed before succeeding dependent stages of the pipeline are started. However, rather than operating in a sequential fashion wherein each stage only initiates operations upon actual completion of a subtask from a previous stage, this arrangement provides for the possibility of stage sequencing so that stage operations may overlap as shown in FIG. 3. Note that stages may be permitted to overlap; stages may be initialized in advance, thereby overlapping the initialization of a stage with the execution of a previous subtask in that stage; and the timing requirement for the stages may be driven by considerations other than by data communication considerations.

As described, the appropriate initialization block must perform its function before the SA may begin performing its appointed subtask. Therefore, the time required for the INIT blocks to perform their tasks must also be factored into the timing analysis. One method of including the time required for the INIT blocks is shown in section 314 of FIG. 3. In this embodiment of the present invention, the time delay required from the start of the first INIT block 120 relative to the start of the second INIT block 121 is determined and illustrated as 315. Similarly, the delay for the start of the third INIT block 122 relative to the start of the first INIT block 120 is illustrated as 316, the delay to the start of the fourth INIT block 103 is 317 and the start for the fifth INIT block 124 is 318. For example, if the first INIT block begins at time 0, the start of the second INIT block may be delayed by 10 microseconds, the start of the third INIT block may be delayed by 15 microseconds, the start of the fourth INIT block may be delayed by 40 microseconds and the start of the fifth INIT block may be delayed by 35 microseconds.

Once these time delays are determined, a sequence of counters may be configured to trigger these events in increasing temporal order, which in this example would be 301, 302, 303, 305, 304. Events occurring at the same time delay are triggered simultaneously. Each counter in this sequence is designated to count the difference in time between successive events. These counters form one portion of pipeline timing controller 130 of FIG. 1. The use of counters inside the timing controller is only one embodiment of the present invention. In another embodiment, a sequence of shift registers may be used instead of counters to count the time delays between successive events. In another embodiment, a programmable controller may be used that can emit control signals at carefully controlled time intervals.

Note from FIG. 3 that the initialization of some stages may require a longer time than the initialization of other stages. Therefore, the delay associated with the start of the various initialization stages may be different from the time delay associated with the start of the processes within the various stages of the pipeline. Note that the sequencing of stages may be accomplished using absolute times, relative times, microseconds or clock cycles. The order of the start of initialization stages may also be different from the order of start of the processes within various stages. Note also that the initialization counters trigger stage operations by temporal order that may be different than by stage order. For example, stage 5 of FIG. 3 must be started prior to stage 4 because of the larger initialization period required. This is shown by the larger stage 5 initialization area 305 as compared to stage 4 initialization area 304. Also as shown by the relative positioning of stages 4 and 5, stage 5 initialization begins prior to stage 4 initialization. Note also that the temporal order of the stages may vary in different circuit configurations.

In another embodiment, the time required for the various FINAL blocks may also be considered in determining the time delays between the various stages. Once the time delays associated with the INIT blocks, the SA blocks, and the FINAL blocks have been determined, a mechanism for triggering the various components of the pipeline at the appropriate time must be designed while minimizing the amount of resources used. In one embodiment, the INIT events trigger the stage processing and the stage processing trigger the FINAL events. Other embodiments of the invention may include other triggering mechanisms.

Note that pipelines are used to process a sequence of tasks. The minimum time required for a pipeline to become ready to accept the next task from the time it accepts the current task may be referred to as the Minimum Inter-Task Interval (MITI). The MITI is the minimum interval time permitted between successive initiations of external tasks. It may also be referred to as the task arrival rate. Tasks may arrive at the MITI or longer intervals. If successive external tasks arrive before the passage of an amount of time equal to the MITI, some stage in the pipeline may still be processing the previous task while it is triggered to execute the next task. This implies that the total time taken by the initialization, stage computation, and finalization of a subtask in a stage cannot exceed MITI when the initialization and the finalization do not overlap with the stage computation. In another embodiment, the time taken by the maximum of initialization, stage computation, and finalization of a subtask in a stage cannot exceed MITI when the initialization and finalization are allowed to be overlapped with the computation. Likewise, the time delay controlled by each counter in the timing controller is also bounded by MITI. If the delay between two successive events happens to be larger than MITI, it is split into multiple events each of which is no longer than a MITI, so that each counter in the corresponding sequence of counters has completed its previous count and is ready to control the next task when it arrives after MITI cycles.

Figure 4:
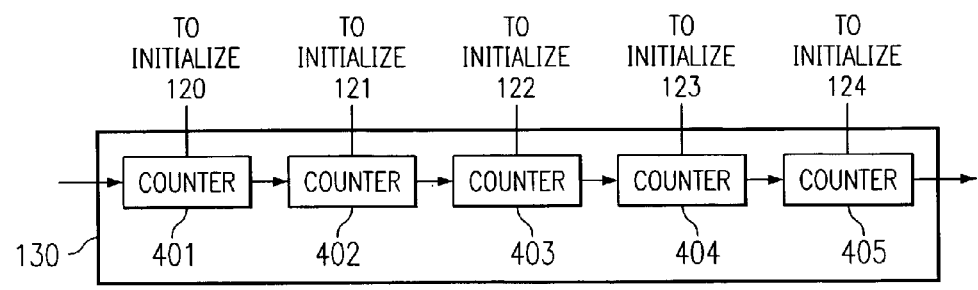
FIG. 4 is a diagram of one embodiment of pipeline timing controller in which a single counter is available for each stage of pipeline.

FIG. 4 shows one embodiment of pipeline timing controller 130 in which a single counter is available for each stage of pipeline 100. In this embodiment, counters 401-405 are available to ensure proper timing of the various stages of the pipeline. In one embodiment, the count completion signal of counter 401 may be connected to the start signal of the INIT block 120 of FIG. 1. Similarly, counters 402, 403, 404 and 405 are electrically connected to INIT blocks 121, 122, 123 and 124 respectively. In this configuration, pipeline timing controller 130 controls the operation of pipeline stages through counters 401-405. For example, at the start of a new task the timing controller starts the counter 401. At the completion of its designated count, the counter 401 sends a signal to INIT block 120 that causes INIT block 120 to begin its operation. Once INIT block 120 initializes, a signal is sent to SA 101 so that SA 101 may perform its required operations on incoming data 110. Upon completion of SA 101's operation, a signal is sent to FINAL block 125 that completes the operation that may include storing data received from SA 101.

Meanwhile, the completion signal from counter 401 also starts counter 402. At the completion of its designated count, counter 402 sends a signal to INIT block 121 to start initialization of data for use in SA 102. In one embodiment the values of the counters in pipeline timing controller 130 may be established to ensure that all processing, including finalization of first stage and the initialization of the second stage, is completed prior to the start of operations in the second stage, SA 102. Note, however, that the relative timing established by counters 401-405 may be adjusted to ensure input data is processed through pipeline 100 as quickly as possible that may include an overlap in the operation of stages, their initialization, or finalization. For example, if buffer 106 introduces no delay in the pipeline process, and the initialization required in INIT 121 takes ten microseconds, counter 402 may send a signal to INIT 121 to begin ten microseconds prior to the completion of finalization in FINAL block 125.

By beginning the process directed by INIT 121 sooner, data is processed through pipeline 100 more rapidly. Note also that counters 401-405 may also be adjusted to allow partial overlap of the stage computation. For example, if six microseconds are required for data to be stored in buffer 106 after being produced from SA 101, counter 402 may signal INIT 121 to begin at a time such that the actual computation in SA 102 starts as early as six microseconds after the first data is produced in SA 101. Counter 401-405 may also be designed to control multiple events in parallel. For example, if data is written into buffer 106 before finalization is completed in FINAL block 125, counter 402 may begin initialization in INIT block 121, while finalization is being completed in FINAL block 125 or while data is being stored in buffer 106.

By predefining the required time for data to flow between pipeline stages, counters 401-405 ensure data flows through pipeline stages as quickly as possible. Each counter may start a stage configuration controller for initialization, start the stage execution, or start the stage configuration controller for finalization. Note that counters 401-405 of FIG. 4 may also be configured to allow for pipeline initialization, pipeline cleanup, data availability, or any other timing consideration. Tasks in stages may be performed serially or in parallel and multiple tasks may be controlled simultaneously.

FIG. 5 illustrates an alternate embodiment of pipeline timing controller 130. In this embodiment, outputs of counters 501, 504, 507, 510 and 513 are electrically connected to control inputs INIT blocks 120-124 to initiate operations thereof, respectively. Outputs of counters 502, 505, 508, 511 and 514 are electrically connected to control inputs of SAs 101-105, respectively. Outputs of counters 503, 506, 509, 512 and 515 are electrically connected to control inputs FINAL blocks 125-129, respectively. In this embodiment, initialization, stage computation and finalization within each of the stages have independent counters, and the counter values may be defined to overlap the initialization or the finalization of a stage with the stage computation. In this case, as soon as a subtask is completed in a stage, it can switch to the next subtask thereby processing data through the pipeline more quickly. Note that buffers may also be available between adjacent SA elements.

Figure 6:
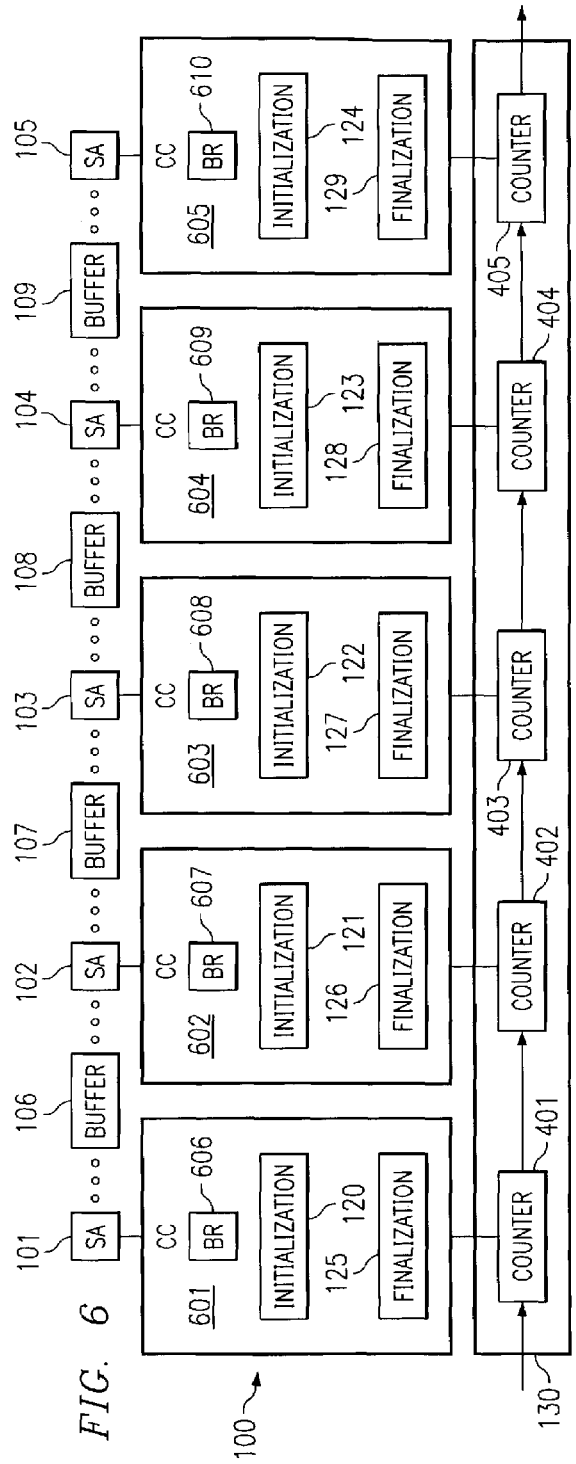
FIG. 6 is a block diagram showing possible connections between a configuration controller and the pipeline timing controller according to one embodiment of the present invention.

FIG. 6 illustrates another embodiment of pipeline 100 where the INIT and the FINAL blocks for each stage are replaced by a general configuration controller for that stage which configures the stage for initialization and finalization and mediates access to the control data between the external world and the stage computation (SAs). As previously described, pipeline stages may require access to additional information. When additional data is required, a configuration controller may be used to copy data from an external memory to internal registers of a stage for initialization of the stage. The configuration controller may also be used to move data from the stage internal registers to external memory during finalization. Individual configuration controllers may be available for each pipeline stage that requires access or storage to external memory or a single configuration controller may be used for enabling multiple pipeline stages to access external memory. Configuration controllers include one or more base registers to record the start of a task frame block in memory where control data for the given task is stored. These base registers may also be pipelined so that the base register of one stage automatically copies the value of the base registers in the previous stage when the stage initialization event is initiated. The configuration controllers may do additional pre- and post-processing besides initialization and finalization of the control data to facilitate the corresponding stage computation.

FIG. 6 shows configuration controllers 601-605 electrically connected to counters 401-405 respectively of pipeline timing controller 130. Configuration controllers 601-605 include base registers 606-610, respectively, that are used to store memory addresses containing information required by SAs 101-105 respectively. If access to external information is required by a stage of pipeline 100, a counter, such as counter 401 may be used to send a signal to configuration controller 601 that ensures the associated pipeline stage may access the required information. Various embodiments of the configuration controllers may provide access to the external memory by (1) transferring a memory address to the respective pipeline stage, (2) accessing the external memory address and providing the information contained in the external memory address to the pipeline stage, (3) providing the external memory address to a separate means of memory access (such as a Direct Memory Access engine) that then accesses the memory address and provides the data to the pipeline stage, or (4) any similar method that ensures the pipeline stage has access to the stored data. Note that counters may be eliminated from FIG. 6 (or for that matter FIG. 1) if not necessary for proper circuit operation. For example, counter 401 may be eliminated if SA element 101 may start immediately without a delay.

Figure 7:
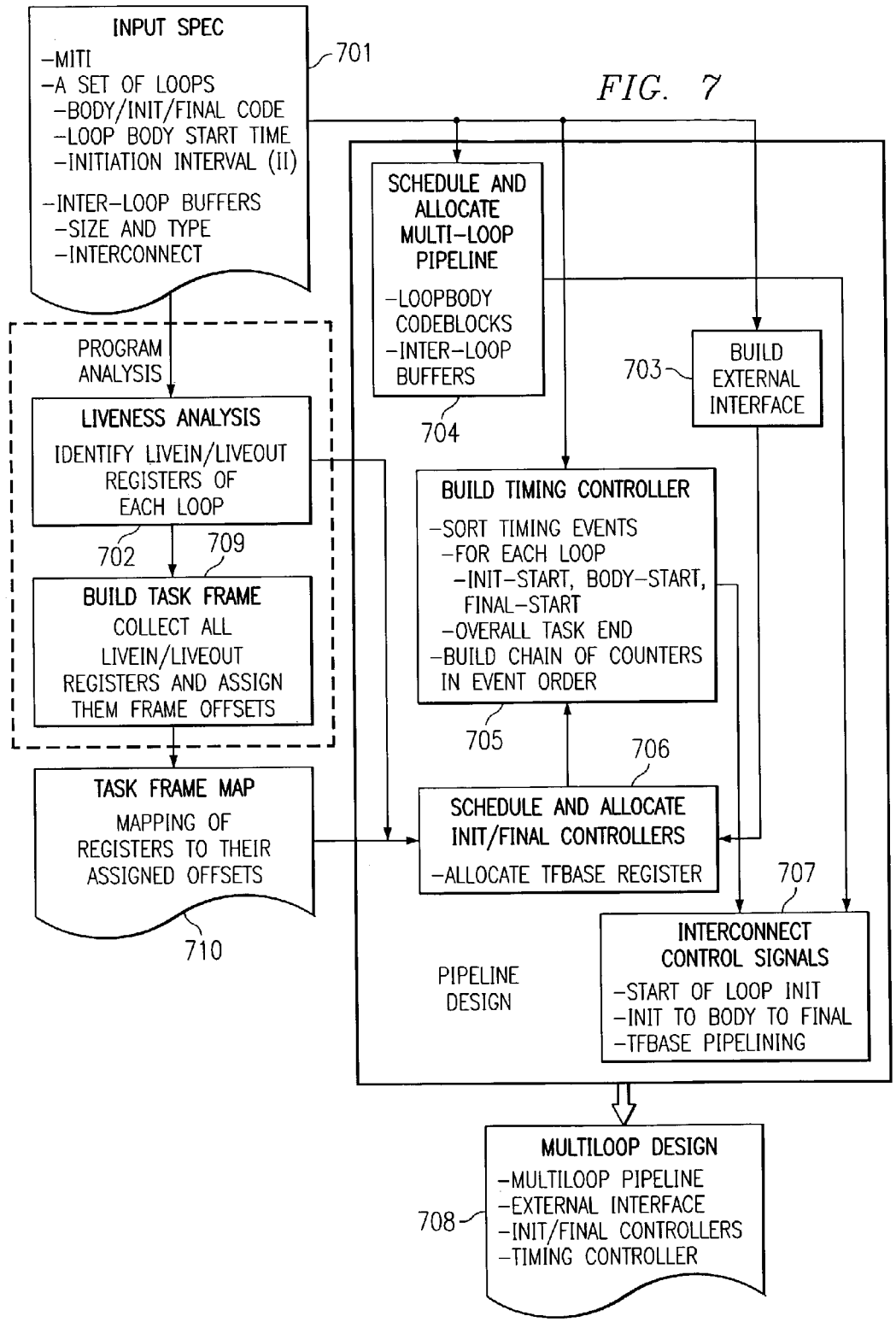
FIG. 7 is a flow diagram depicting a processor pipeline controller design that may be used with an embodiment of the present invention.

FIG. 7 shows a processor pipeline controller flow that may be used with the current invention. Input specification 701 supplies the relevant information to design the pipeline hardware including, for example, the MITI, a set of loops each of which consists of the initialization code, the body code and the finalization code, an initiation interval and a start time for each loop relative to the start of the first loop, and a description of the inter-loop buffers used in the design including their size, type, and the connections to the various pipeline stages. This information may be provided manually or automatically by analyzing the input program such as in concurrently filed, co-pending patent application Ser. No. 10/284,932, entitled A Method of, System and Program for the Design of Pipelines of Processors, the disclosure of which is hereby incorporated by reference herein.

The multi-loop pipeline controller design may be divided into two major phases: the first phase analyzes the program and gathers bookkeeping information (steps 702 and 709), and the second designs the pipeline hardware using the information (steps 703, 704, 705, 706, and 707). Step 702 in the program analysis phase is liveness analysis that reads input specification 701 and identifies the input and the output (live-in, live-out) registers used within each loop. In step 709, these registers are collected to form the task frame and are each assigned an offset address. Task frame map 710 is generated from this step that records the mapping between the registers and their assigned task frame offset addresses.

The pipeline design phase builds various hardware modules that comprise the pipeline's external interface, the data path and the control path. In step 703, the external interface hardware (e.g. host IF block) is built that accepts a start-of-task signal and a task frame base address in order to start a new task at time intervals of MITI or longer. It also returns the end-of-task signal every time a task finishes from the last stage of the pipeline. In step 704, the various pipeline stages are built out of the loop body code blocks as given by input specification 701. The inter-loop buffers are also allocated in this step and connected to their respective pipeline stages. In step 705, the order and the time of various events for pipeline stage initialization, computation, and finalization is decided. A timing controller is also allocated in this step that executes these events in the right order. In step 706, a configuration controller is allocated for each stage of the pipeline consisting of an initialization controller, one or more base registers, and a finalization controller. Either the initialization or the finalization controller may be empty. In step 707, the various control signals of the pipeline are interconnected producing final multi-loop design 708.

In one implementation of this design flow, the code to perform the initialization and finalization tasks is automatically generated in step 706 using task frame map 710. The initialization block code consists of operations that load live-in data from its frame offset relative to the task frame base register, and then store it into the corresponding live-in register of the systolic array pipeline stage. The last operation in the initialization block is to start the computation in that pipeline stage. The finalization block code consists of operations that load the live-out data from the live-out register of the systolic array pipeline stage and then store it back into the task frame offset specified in task frame map 710, relative to the task frame base register. This code is then scheduled in time for a simple hardware scheme as shown in FIG. 2. Initialization and finalization block hardware is then allocated automatically to initialize the task frame base address register and to execute the initialization and finalization code respectively.

The length of the code scheduled in the initialization and finalization blocks so generated defines the duration of the time spent during initialization and finalization time intervals (e.g. 301-305). These, together with the relative time of start of the computation within each pipeline stage as specified in input specification 701 are used in step 705 to identify a proper ordering and the timing of the initialization, computation, and finalization block start events. In one implementation, the finalization blocks are automatically started by the termination event of the stage computation and hence do not need to be directly controlled by the timing controller. The start of a pipeline stage initialization event is computed by subtracting the initialization time interval from the relative start time of the corresponding stage computation.

The initialization events so obtained are then sorted in increasing time order. The timing of these events is then linearly adjusted to start from zero by subtracting the start time of the first initialization event from every initialization event. The timing and ordering of initialization events so obtained are then converted into hardware by allocating a series of counters that are initialized to the difference of timings between successive events. If the difference in timing exceeds MITI, it is split across multiple counters each of which counts no longer than MITI. Due to the timing adjustment done above, the first initialization event starts at time zero and hence does not need a counter. The event of each subsequent counter reaching a zero count becomes the initialization signal for the subsequent stages of the pipeline scheduled to start at that time. The series of counters so constructed constitute the timing controller that signals the start of each pipeline stage at the appropriate time.

In another implementation, all control signals are interconnected in step 707 as follows. The start-of-task signal from the external interface is wired to the timing controller. The data and control signals carrying task frame base address from the external interface is wired to the first initialization block and is pipelined to the subsequent initialization and finalization blocks in temporal sequence. The various pipeline stage start signals from the timing controller are connected to the corresponding initialization blocks. The data and control signals from the initialization blocks to load the live-ins and to start the stage computation is connected to the corresponding SA stage. The termination signal from each pipeline stage is connected to the start of the finalization block. The completion of the last finalization block generates the end-of-task signal that is returned to the external interface.

What is claimed is:

1. A pipeline data processor for performing successive subtasks of a task procedure, the pipeline comprising:
    a plurality of stages, each stage comprising hardware for performing a corresponding subtask and a memory location pointer being propagated among the stages, a plurality of the stages using the memory location pointer to access information for initializing the corresponding stage for performing its corresponding subtask wherein the memory location pointer points to a task frame stored in memory, the task frame comprising the information for initializing the plurality of the stages that use the memory location pointer with different portions of the task frame having the information for initializing each of the plurality of stages that uses the memory location pointer; and
    a pipeline timing controller controlling a plurality of predetermined delays, wherein, when one of said predetermined delays has expired, said pipeline timing controller sends a control signal to initiate at least one process within associated ones of said plurality of stages.

2. The pipeline of claim 1 wherein:
    said control signal controls at least one of the initialization, start of computation, and finalization of a stage of said pipeline.

3. The pipeline of claim 1 wherein:
    a first predetermined delay represents an amount of time before a first stage of said pipeline starts computation.

4. The pipeline of claim 1 wherein:
    said pipeline timing controller sends a control signal to an initialization block and said initialization block is in communication with at least one stage of said plurality of stages.

5. The pipeline of claim 1 wherein:
    said pipeline timing controller sends a control signal to an initialization block, said initialization block sends a second control signal to at least one stage of said plurality of stages, and said stage sends a third control signal to a finalization block.

6. The pipeline of claim 1 wherein:
    said pipeline timing controller includes a plurality of counters wherein each counter is designated with a predetermined delay wherein upon expiration of said designated predetermined delay said counter produces a control signal.

7. The pipeline of claim 6 wherein:
    a first counter having a first predetermined delay provides a first control signal to an initialization block, and a second counter having a second predetermined delay provides a second control signal to at least one stage of said plurality of stages.

8. The pipeline of claim 7 wherein:
    said first predetermined delay represents an amount of time required to elapse before the start of initialization of data, and said second predetermined delay represents an amount of time required to elapse before the start of processing of data in at least one stage of said plurality of stages.

9. The pipeline of claim 6 wherein:
    a first counter having a first predetermined delay provides a first control signal to an initialization block, a second counter having a second predetermined delay provides a second control signal to one stage of said plurality of stages and a third counter having a third predetermined delay provides a third control signal to a finalization block.

10. The pipeline of claim 6 wherein said counters are self initializing counters.

11. The pipeline of claim 1 further including a plurality of configuration controllers each of which configure at least one stage of said plurality of stages.

12. The pipeline of claim 1 wherein said timing controller is configured to simultaneously control multiple tasks in different stages of the said pipeline.

13. The pipeline of claim 1 wherein said timing controller is configured to simultaneously control multiple tasks in at least one of initialization, computation, and finalization of the same stage in said pipeline.

14. The pipeline of claim 1 wherein an initialization block for each of the at least one stage uses the memory location pointer to retrieve control information via a memory interface and wherein the initialization block for each of the at least one stage passes the control information to a data path element.

15. The pipeline of claim 14 wherein the control signal is sent to the initialization block for a stage.

16. The pipeline of claim 15 wherein the control signal is sent to the initialization block for a stage before the stage has completed performing a prior subtask for the stage.

17. The pipeline of claim 1 wherein initializing the stage for performing its corresponding subtask begins before the stage has completed performing a prior subtask for the stage.

18. The pipeline of claim 1 wherein the subtask for at least one stage includes at least one loop nest of the task procedure and the hardware for the at least one stage includes an any of processing elements for performing the at least one loop nest and the at least one stage using the memory location pointer to access information for initializing the corresponding stage.

19. A method of controlling the progression of data through a plurality of pipeline stages for performing subtasks of a task procedure, said method including the steps of:
providing a plurality of stages, each stage comprising hardware for performing a corresponding subtask and each stage of said plurality of pipeline stages having predetermined timing characteristics;
designing a timing controller with a plurality of control signals that are characterized by the predetermined timing characteristics of each stage of said plurality of pipeline stages;
electrically connecting said plurality of control signals to said plurality of pipeline stages;
propagating a memory location pointer among the stages, a plurality of the stages using the memory location pointer to access information for initializing the corresponding stage for performing its corresponding subtask wherein the memory location pointer points to a task frame stored in memory, the task frame comprising the information for initializing the plurality of the stages that use the memory location pointer with different portions of the task frame having the information for initializing each of the plurality of stages that uses the memory location pointer; and
signaling each stage of said plurality of pipeline stages with a respective one of said plurality of control signals so as to schedule the progression of data through the plurality of pipeline stages.

20. The method of claim 19 further including:
providing initialization data to be used by at least one stage of said plurality of pipeline stages.

21. The method of claim 19 further including:
receiving finalized data produced by at least one stage of said plurality of pipeline stages.

22. The method of claim 19 wherein:
designing said timing controller as a plurality of counters wherein each counter is assigned a predetermined count representing the timing characteristics of each stage of said plurality of pipeline stages.

23. The method of claim 19 wherein:
said step of signaling is used to introduce a delay in the processing performed by individual pipeline stages in said plurality of pipeline of stages.

24. The method of claim 23 wherein:
said delay represents an amount of time before a respective pipeline stage starts computation.

25. The method of claim 19 wherein:
said step of signaling is performed by a pipeline timing controller that sends a control signal to each individual stage of said plurality of pipeline stages.

26. The method of claim 19 further including:
initializing input data for at least one stage of said plurality of pipeline stages; and
finalizing output data from at least one stage of said plurality of pipeline stages.

27. The method of claim 26 further including:
signaling said step of initializing input data; and
signaling said step of finalizing output data.

28. The method of claim 19 wherein the subtask for at least one stage includes at least one loop nest of the task procedure and the hardware for the at least one stage includes an array of processing elements for performing the at least one loop nest and the at least one stage using the memory location pointer to access information for initializing the corresponding stage.

29. A method of controlling the progression of data through a plurality of pipeline stages for performing subtasks of a task procedure, said method including the steps of:
providing a plurality of stages, each stage comprising hardware for performing a corresponding subtask and each stage of said plurality of pipeline stages having predetermined timing characteristics;
propagating a memory location pointer among the stages, a plurality of the stages using the memory location pointer to access information for initializing the corresponding stage for performing its corresponding subtask wherein the memory location pointer points to a task frame stored in memory, the task frame comprising the information for initializing the plurality of the stages that use the memory location pointer with different portions of the task frame having the information for initializing each of the plurality of stages that uses the memory location pointer; and
initiating a process within associated one of said plurality of stages, wherein initiation of the process is responsive to the expiration of a first predetermined delay.

30. The method of claim 29 wherein the subtask for at least one stage includes at least one loop nest of the task procedure and the hardware for the at least one stage includes an array of processing elements for performing the at least one loop nest and the at least one stage using the memory location pointer to access information for initializing the corresponding stage.

* * * * *

UNITED STATES PATENT AND TRADEMARK OFFICE
CERTIFICATE OF CORRECTION

PATENT NO. : 7,484,079 B2  Page 1 of 1
APPLICATION NO. : 10/284965
DATED : January 27, 2009
INVENTOR(S) : Shail Aditya Gupta et al.

It is certified that error appears in the above-identified patent and that said Letters Patent is hereby corrected as shown below:

In column 13, line 3, in Claim 18, delete "any" and insert -- array --, therefor.

In column 13, line 49, in Claim 23, after "pipeline" delete "of".

Signed and Sealed this

Twenty-first Day of April, 2009

JOHN DOLL
*Acting Director of the United States Patent and Trademark Office*